Sept. 4, 1945. S. MENDELSOHN 2,384,327
EJECTOR SOCKET
Filed Jan. 15, 1942
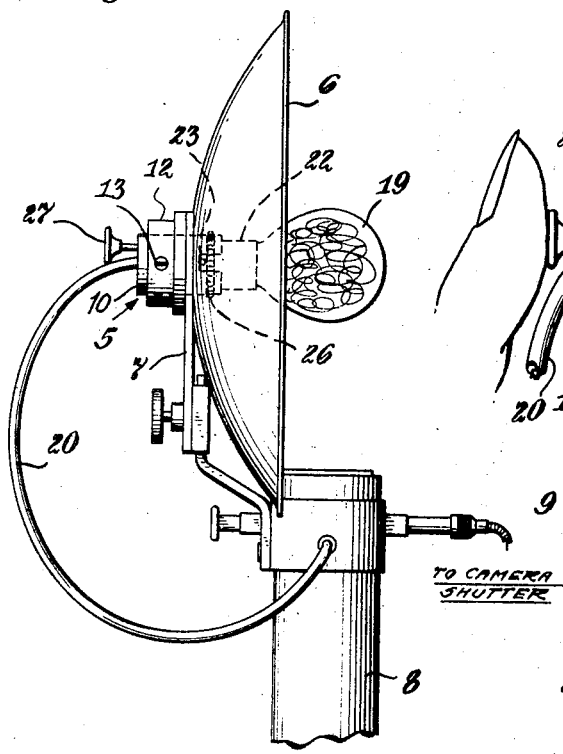
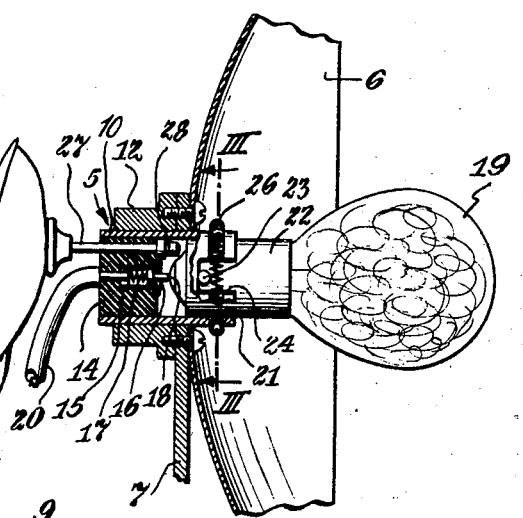
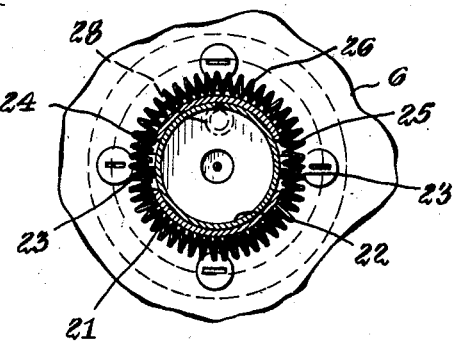
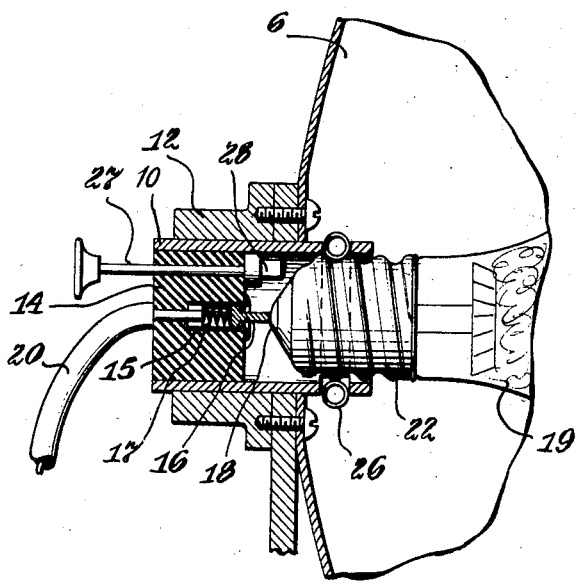
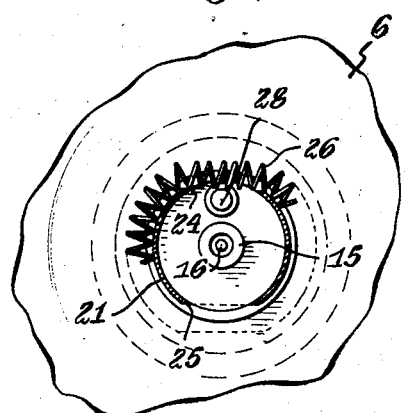
INVENTOR
S. MENDELSOHN
BY
ATTORNEY Patented Sept. 4, 1945

2,384,327

UNITED STATES PATENT OFFICE 2,384,327

EJECTOR SOCKET

Samuel Mendelsohn, Montclair, N. J.

Application January 15, 1942, Serial No. 426,797

5 Claims. (Cl. 173—328)

The present invention relates to a socket for a photoflash lamp and more particularly to what may be termed an ejector socket for a camera synchronizer.

In the art of photography camera synchronizers are now quite extensively employed for causing complete opening of a camera shutter simultaneously with the moment of peak intensity from a photoflash lamp. It frequently happens that after making an exposure a photographer desires to immediately take another exposure before the scene or object changes which necessitates removal of the hot used lamp and insertion of a new one in the socket. This has required so much time to perform that the particular scene in many instances is lost to the photographer despite his efforts to change lamps even at the risk of burning his fingers from the hot lamp.

Recognizing the necessity for quickly changing lamps ejector sockets have been developed for use with camera synchronizers for the purpose of expelling the hot lamp from the socket without it being touched by the photographer so that a new lamp can be inserted. However, time has heretofore been consumed in securing the new lamp in the socket since this requires rotation of the lamp ranging from a partial turn to several turns. Moreover, such ejector sockets, as shown in the above noted copending application, have been somewhat expensive to manufacture.

It is accordingly an object of the present invention to provide an ejector socket for photoflash lamps which is of exceedingly simple construction and very economical to manufacture.

Another object of the present invention is the provision of an ejector socket for photoflash lamps wherein the hot used lamp can be propelled from the socket without its being touched by hand and a new lamp readily inserted without the necessity of rotating the replacement lamp.

A further object of the present invention is the provision of an ejector socket for photoflash lamps wherein the hot used lamp is propelled from the socket and a replacement lamp inserted by simply pushing the latter into the socket.

Still further objects of the present invention will become obvious to those skilled in the art by reference to the accompanying drawing wherein:

Fig. 1 is a fragmentary side elevational view of a camera synchronizer provided with the ejector socket of the present invention;

Fig. 2 is a sectional view of the ejector socket of the present invention with parts of the synchronizer of Fig. 1 broken away to better illustrate the socket;

Fig. 3 is a sectional view taken on the line III—III of Fig. 2;

Fig. 4 is a view similar to Fig. 2 but showing the ejector socket of the present invention when a standard screw-base photoflash lamp is used therein, and Fig. 5 is a fragmentary sectional view showing more in detail a portion of the ejector socket of the present invention.

Referring now to the drawing in detail the ejector socket of the present invention is shown generally at 5 in Fig. 1 and is secured to a reflector 6 and adjustable bracket 7, the latter of which is secured to a battery case 8 housing the customary dry cells, and a suitable cable 9 extends to the camera shutter to complete the synchronizer. Inasmuch as the synchronizer per se forms no part of the present invention it is deemed unnecessary to describe the same herein in any more detail. It should suffice to say that it may be of the type shown and claimed in Patent No. 2,263,046, issued November 18, 1941, to S. Mendelsohn et al., assignee of the present application.

As shown more particularly in Fig. 2, the ejector socket 5 comprises a metallic sleeve 10 which may be provided with an exterior collar 12 to enable it to be secured to the reflector 6 and bracket 7, with the socket secured in place by a screw 13 (Fig. 1) passing through the collar 12. One end of this sleeve is closed by an insulating plug 14 which is provided with a metallic eyelet or the like 15 coaxially disposed relative to the sleeve 10. A plunger contact 16 slides in this eyelet 15 and is biased outwardly by a coil spring 17 so that this spring is compressed and stores potential energy when engaged by the contact terminal 18 of a photoflash lamp 19 upon insertion of the latter in the socket.

Electrical energy is transmitted to the center contact of the photoflash lamp 19 from the batteries (not shown) within the casing 8, by a conductor 20 which is soldered or otherwise secured to the metallic eyelet 15, with the remainder of the electrical circuit being completed from the shell portion 22 of the lamp base through the metal of which the synchronizer is constructed. As can be appreciated from Fig. 2, the ejector socket, as illustrated, is adapted to accommodate a photoflash lamp provided with a bayonet-clutch type of base. However, in lieu of the customary L-shaped slots normally required to retain the base pins 23 in engagement with the socket, the socket of the present invention is merely knotched as at 24 and 25 for an appreciable portion of its periphery thus requiring that the photoflash lamp 19 be merely pushed inwardly of the socket 5 against the tension of the plunger contact spring 17.

In order to retain the photoflash lamp 19 within the socket 5 a coil spring 26 is wound about the periphery of the socket and fits in a small groove 21 at a point just above the bottom of the notches 24 and 25 which leaves a spacing between the convolutions of the spring 26 and the bottom of the notches corresponding approximately to the diameter of the base pins 23. Also since the notches 24 and 25 extend for an appreciable distance, as above noted, about the periphery of the sleeve 10, this causes numerous convolutions of the spring 26 to be tangentially disposed relative to sleeve 10 at these notches, as can be better appreciated by reference to Fig. 5, thus disposing the outer periphery of some of the spring convolutions within the confines of the sleeve 10.

Accordingly, upon pushing of the photoflash lap 19 into the socket, the base pins 23 ride over the spring convolutions within the sleeve 10, which yield outwardly allowing the base pins to pass beneath the spring 26, after which it snaps back into its normal position retaining the base pins between the spring and bottom of the notches 24 and 25, as shown in Figs. 2 and 3. Thus the photoflash lamp is retained firmly within the socket and in electrical connection with the entire camera synchronizer and at the same time potential energy is stored in the spring 26 by its slight expansion.

When an exposure with attendant ignition of the lamp has been made and the photographer desires to quickly eject the flashed lamp from the socket, he merely depresses with his finger a push rod 27 as shown in Figs. 2 and 4. Since this push rod slides through the insulating plug 14 the end 28 thereof contacts the base of a photoflash lamp 19 forcing the base pins 23 past the coil spring 26. Once over the convolutions of this latter spring 26, the potential energy stored in the plunger contact spring 17 upon insertion of the lamp 19 in the socket together with the energy from the expanded spring 26, ejects the entire photoflash lamp from the socket without the photographer having to touch the hot lamp. A new lamp is then quickly inserted by merely pushing it inwardly of the socket as above mentioned.

The modification as shown in Fig. 4 while adapting the ejector socket of the present invention to photoflash lamps having a standard screw-threaded base, it differs in no material aspects from that as above described. It is preferable, however, to increase the peripherial length of the notches 24 and 25 in the socket when it is to be employed for screw base lamps so as to increase the number of spring convolutions 26 (or length of the spring) disposed within the confines of the sleeve 10. This enables the spring to bear against a greater peripherial surface of the shell of the screw base 22 (Fig. 4) to more rigidly retain the lamp in the socket which is not required where base pins are provided as in the case of the lamp of Figs. 1 to 3. In ejecting the lamp of Fig. 4, it is again only necessary to depress the push rod 27 which forces the base 22 of the lamp 19 outwardly with the remaining threads of the lamp base riding through the spring 26 until free thereof after which the spring 17 again expels the lamp entirely free of the socket 5.

It thus becomes obvious to those skilled in the art that an ejector socket for photoflash lamps is herein provided which can be readily employed with camera synchronizers. Moreover, the hot used lamp is quickly expelled from the socket without the necessity of the photographer touching the lamp and a new lamp can be readily inserted by simply pushing the lamp downwardly into the socket. In addition, due to the simplicity of its construction the ejector socket of the present invention is exceedingly economical to manufacture.

Although two embodiments of the present invention have been shown and described it is to be understood that still further modifications thereof may be made without departing from the spirit and scope of the appended claims.

What is claimed is:

1. An ejector socket for a photoflash lamp comprising a metal sleeve, retaining means carried by said socket and engageable with the base of said photoflash lamp for maintaining the latter in said sleeve upon longitudinal movement of said lamp into said socket, and means carried by said socket normally in spaced relation to the base of said lamp and operable from the exterior of said socket into engagement with the base of said lamp to render said retaining means ineffective and to cause longitudinal ejection of said lamp from said socket.

2. An ejector socket for a photoflash lamp comprising a metal sleeve, retaining means carried by said socket and engageable with the base of said photoflash lamp for maintaining the latter in said sleeve upon longitudinal movement of said lamp in said socket, potential energy storage means in said sleeve for storing energy upon depression of said lamp in said socket, and means carried by said socket normally disengaged from said lamp and operable from the exterior of said socket into engagement with the base of said lamp to render said retaining means ineffective and said potential energy storage means effective to longitudinally eject said lamp from said socket.

3. An ejector socket for a photoflash lamp comprising a metal sleeve closed at one end and provided with a contact terminal at said closed end for transmitting electrical energy to a photoflash lamp when inserted in said sleeve, resilient means carried by said socket for retaining the base of said photoflash lamp in said sleeve upon longitudinal depression of said lamp in said socket, and means carried by said socket and operable from the exterior of said socket into engagement with the base of said lamp to render said resilient means ineffective and to cause said lamp to be ejected from said socket.

4. An ejector socket for a photoflash lamp comprising a metallic sleeve closed at one end and provided with a spring pressed contact terminal therein, resilient means carried by said socket for retaining the base of said photoflash lamp in said sleeve against the tension of said spring pressed contact terminal upon longitudinal movement of said lamp into said socket, and a plunger carried by said socket and operable to move said lamp longitudinally of said socket and render said resilient means ineffective with attendant longitudinal ejection of said lamp from said socket by the energy stored in said spring pressed contact terminal.

5. An ejector socket for a photoflash lamp comprising a metallic sleeve closed at one end and provided with a spring pressed contact terminal therein, resilient means disposed about the periphery of said sleeve and having portions thereof tangentially positioned interiorly of said sleeve and radially yieldable upon depression of said lamp in said socket for holding the same therein against the tension of said spring pressed contact terminal, and a plunger extending through the closed end of said sleeve and depressible to move said lamp longitudinally of said socket and render said resilient means ineffective with attendant longitudinal ejection of said lamp from said socket by the energy stored in said spring pressed contact terminal.

SAMUEL MENDELSOHN.